(12) United States Patent
Nandy et al.

(10) Patent No.: US 8,176,089 B1
(45) Date of Patent: May 8, 2012

(54) EFFICIENT STORAGE AND MANIPULATION OF STRUCTURED DOCUMENTS

(75) Inventors: Kousik Nandy, Bangalore (IN); Ganesan Vivekanandan, Bangalore (IN)

(73) Assignee: Sonoa Networks India (PVT) Ltd., Bangalore, Karnataka (IN)

( * ) Notice: Subject to any disclaimer, the term of this patent is extended or adjusted under 35 U.S.C. 154(b) by 434 days.

(21) Appl. No.: 12/414,667

(22) Filed: Mar. 31, 2009

Related U.S. Application Data (60) Provisional application No. 61/040,726, filed on Mar. 31, 2008.

(51) Int. Cl.
*G06F 17/30* (2006.01)
*G06F 15/16* (2006.01)

(52) U.S. Cl. ......................................... 707/802; 709/218

(58) Field of Classification Search .................. None
See application file for complete search history.

(56) References Cited

U.S. PATENT DOCUMENTS

| | | | |
|---|---|---|---|
| 5,457,793 A * | 10/1995 | Elko et al. ..................... | 711/100 |
| 6,941,308 B1 | 9/2005 | Chilton | |
| 2006/0146881 A1 | 7/2006 | Basso et al. | |
| 2006/0187963 A1 | 8/2006 | Basso et al. | |
| 2007/0192671 A1 | 8/2007 | Rufener | |
| 2008/0281920 A1 * | 11/2008 | Rosu ............................ | 709/206 |

OTHER PUBLICATIONS

"WSNFS: A Web-Serives-Based Network File System" dated Dec. 16, 2007.*

* cited by examiner

*Primary Examiner* — Tarek Chbouki
(74) *Attorney, Agent, or Firm* — Evergreen Valley Law Group, P.C.; Kanika Radhakrishnan (57) ABSTRACT

A method and system for efficient processing of structured documents is provided. The method includes creating fragments of the structured document. The method also includes creating an ordered list including a plurality of descriptors pointing to the structured document fragments. Further, the method includes modifying the ordered list for manipulating of the structured document. The system includes one or more message blocks. The system also includes a message control block for pointing to the one or more message blocks. Further, the system includes one or more data blocks and a plurality of binary tokens for pointing to the one or more data blocks. Moreover, the system includes a plurality of ordered lists of descriptors.

10 Claims, 8 Drawing Sheets

FIG. 1a

```
120a
  +-+        +----------------------------------------------+
  | +------->|<joke><Q>What do you call a boomerang  that doesn't |
  +-+ 38     +----------------------------------------^-----+
120b |                                                |
  +-+ |                                               |
  | +--------------------------------------------------'
  +-+ 12
120c |
  +-+        +----------------------------------------------+
  | +-------->  come back?</Q><A>A stick.</A></joke>        |
  +-+ 37     +----------------------------------------------+
```

FIG. 1b

```
120a
  +-+      +----------------------------------------------+
  | +------><joke><Q>What do you call a boomerang  that doesn't |
  +-+ 38   +----------------------------------^-----------+
120b |                                         |
  +-+                                          |
  | +-----------------------------------------'
  +-+ 12
120d |
  +-+      +----------------------------------------------+
  | +------> come back?</Q><A>A stick.</A></joke>         |
  +-+ `15' +----------------------------^-----------------+
120e |                                   |
  +-+                                    |
  | +----------------------------------'
  +-+ 7
```

```
    +-+       +-----------------------------------------------------+
    | +------><joke><Q>What do you call a boomerang    that doesn't |
    +-+ 6    +------^---------------------------------^-------------+
120g |      |                                        |
    +-+     |                                        |
    | +-----------------+                            |
    +-+ 32              |                            |
120h |                  |                            |
    +-+                 |                            |
    | +----------------------------------------------------------+
    +-+ 12              |                            |
120i |                  |                            |
    +-+       +---------------------------------------------------+
    | +-----> come back?</Q><A>A stick.</A></joke>               |
    +-+ 15   +--------------------^------------^-----------------+
120j |      |                                  |
    +-+     |                                  |
    |#+------------------------------------+   |
    +- + 15                                    |
    |                                          |
    +-+                                        |
    | +----------------------------------------+
    +-+ 7
```

FIG. 1e

```
    +-+        +-------------------------------------------------+
    | +------><joke><Q>What do you call a boomerang    that doesn't |
    +-+ 6     +-------^---------------------------------^-------+
120j |
    +-+
    +#+-----------------(------.
    +-+ 15              |      |
120g |                  |      |
    +-+                 |      |
    | +----------------'       |
    +-+ 32                     |
120h |                         |
    +-+                        |
    | +------------------------)--------------------------------.
    +-+ 12                     |                                |
120i |                         |
    +-+          +-------------v---------------------------------+
    | +---------> come back?</Q><A>A stick.</A></joke>           |
    +-+ 15       +-----------------------------^-----------------+
    |                                          |
    +-+                                        |
    | +---------------------------------------'
    +-+ 7
```

EFFICIENT STORAGE AND MANIPULATION OF STRUCTURED DOCUMENTS

This patent application claims priority from U.S. provisional patent application No. 61/040,726, filed on Mar. 31, 2008 entitled "EFFICIENT STORAGE AND MANIPULATION OF STRUCTURED DOCUMENTS" and assigned to Sonoa Networks India (Pvt) Ltd., which is hereby incorporated in its entirety.

FIELD

The present disclosure relates to the field of information processing systems and more particularly to processing structured documents in the information processing systems.

BACKGROUND

An information processing system receives a plurality of structured documents. The information processing system processes the structured documents and produces structured documents with processed information. Processing a structured document can include storing the structured document in memory, modifying the structured document and accessing the structured document for further processing or for rendering the structured document. The structured document can be modified by making a plurality of changes in the structured document. Further, the structured document stored in the memory of the information processing system can be accessed for further processing or for rendering. The rendering includes printing of the structured document.

The structured document can also be distributed subsequent to the processing. The structured document can be distributed through network and on-demand printing, electronic data interchange (EDI) and electronic mail. When the volume of the structured documents entering the information processing system is high, it is a challenge to process the structured documents since the speed of processing and the ease of access of the structured document may be affected due to the volume. Further, storing the structured document and modifying the structured document becomes complicated.

Conventional methods for processing the structured documents require the structured documents to be stored in contiguous memory for processing. Further, an additional binary data structure representation of the structured document is created for modifying the structured document. Changes are made in the additional binary data structure and the structured document is rebuilt and stored in the contiguous memory. However, storing the structured document in the contiguous memory may be an inefficient method for storing large structured documents since the large structured documents may not fit in the available free memory space. Further, modifying the structured document when the structured document is stored in the contiguous memory becomes complicated. For example, consider a situation where information has to be added in arbitrary spaces of the structured document for modifying the structured document. In order to enable modification of the structured document by adding information in arbitrary spaces, data may be moved to keep the structured document in the contiguous memory. Further, if the structured document is large then large data can be moved to add information and maintain the structured document in the contiguous memory.

Also, multiple copies of the structured document may be desired. Further, if each of the multiple copies requires modification then the respective numbers of copies are stored in the memory and each one of the copies is modified. This results in inefficient usage of memory.

In light of the foregoing discussion, there is a need for an efficient technique for processing structured documents. Further, memory utility has to be optimized by enabling efficient storage of the structured documents in the memory.

SUMMARY

Embodiments of the present disclosure provide a method and system for efficient processing of structured documents.

An example method of manipulating a structured document includes creating fragments of the structured document. The method also includes creating an ordered list including a plurality of descriptors pointing to the structured document fragments. Further, the method includes modifying the ordered list for the manipulating of the structured document.

An example system for manipulating a structured document includes one or more message blocks. The system also includes a message control block for pointing to the one or more message blocks. Further, the system includes one or more data blocks and a plurality of binary tokens for pointing to the one or more data blocks. Moreover, the system includes a plurality of ordered lists of descriptors.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

Embodiments of the present disclosure provide a method and system for efficient processing of structured documents.

An information processing system receives a plurality of structured documents. The information processing system processes the structured documents and produces structured documents with processed information. One embodiment provides an efficient method for storing the structured documents in a memory of the information processing system. Another embodiment provides an efficient method for manipulating the structured documents. Examples of the structured documents include, but are not limited to, Standard Generalized Markup Language (SGML) documents, Extensible Markup Language (XML) documents and Extensible Hypertext Markup Language (XHTML) documents.

A parser receives the structured document as an input. In some embodiments, the parser receives the structured document as a linked list of buffers. A buffer includes a temporary memory space where text of the structured document is stored as the text is received. The parser parses the buffers and creates binary tokens when the structured document is received.

Figure 1A:
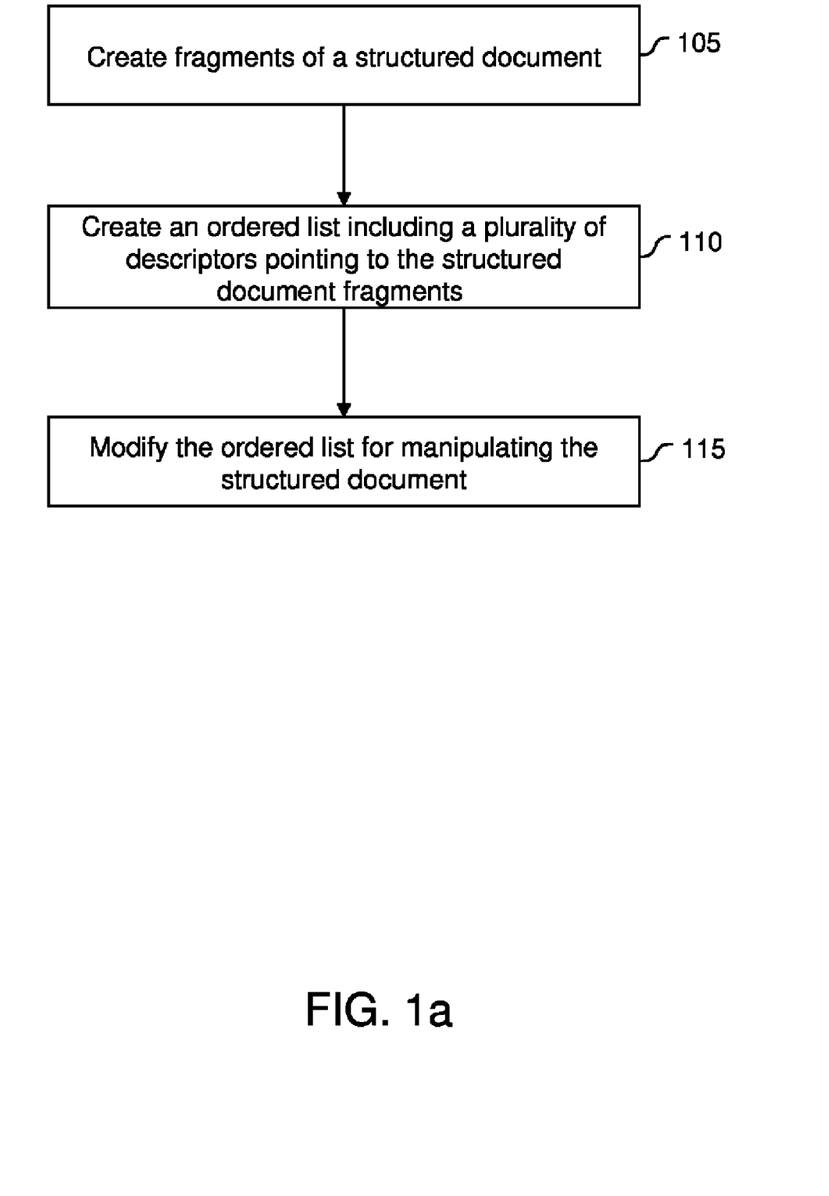
FIG. 1a is a flow diagram illustrating the steps in a method for efficient processing of a structured document in accordance with one embodiment.

FIG. 1a is a flow diagram illustrating the steps in a method for efficient processing of a structured document in accordance with one embodiment.

In some embodiments, efficient processing of structured documents entering an information processing system is performed by optimizing a technique for storing and manipulating the structured document. At step 105, fragments of the structured document are created in a memory of the information processing system. Each structured document entering the information processing system can be stored in the form of fragments to facilitate efficient memory utility.

In some embodiments, the structured document includes one or more message blocks. The message blocks further include access caches and lseek pointers. The access caches include direct pointers to the structured document fragments and the lseek pointers point to an ordered list. The lseek pointers are further used to identify a specific location inside the structured document. In some embodiments, the access caches and the lseek pointers point to a descriptor in the ordered list along with an offset of a data referred.

In some embodiments, the ordered list can include but is not limited to, a doubly linked list.

After storing the structured document fragments, at step 110, the ordered list including a plurality of descriptors pointing to the structured document fragments are created. The entire structured document can be read by following the ordered list of descriptors.

In some embodiments, each of the descriptors point to a start location of data in a structured document fragment and also comprises length of the data. The descriptors last accessed can be further stored in an access cache. Also, the descriptors can point to a same data block with different offsets.

Further, at step 115, the ordered list is modified for manipulating the structured document. The manipulating of the structured document can include, but is not limited to, adding, removing, moving and copying parts of the structured document. The manipulating is performed by modifying the ordered list and any change in the structured document gets reflected on the ordered list. In some embodiments, no changes are made to the original structured document.

In some embodiments, the structured document is manipulated without making a copy of data of the structured document. This facilitates efficient processing of the structured document.

Multiple copies of the structured document can be created without actually copying the data respective number of times. The multiple copies are created by copying the ordered list of descriptors. Further, each copy of the structured document can be modified individually. Instead of creating individual copies of the entire structured document, a common part can be shared between the copies and the difference is stored in the structured document representation of each of the copies with no loss in efficiency. In some embodiments, the difference of the each individual copy is stored in the modified ordered list of descriptors.

Figure 1B:
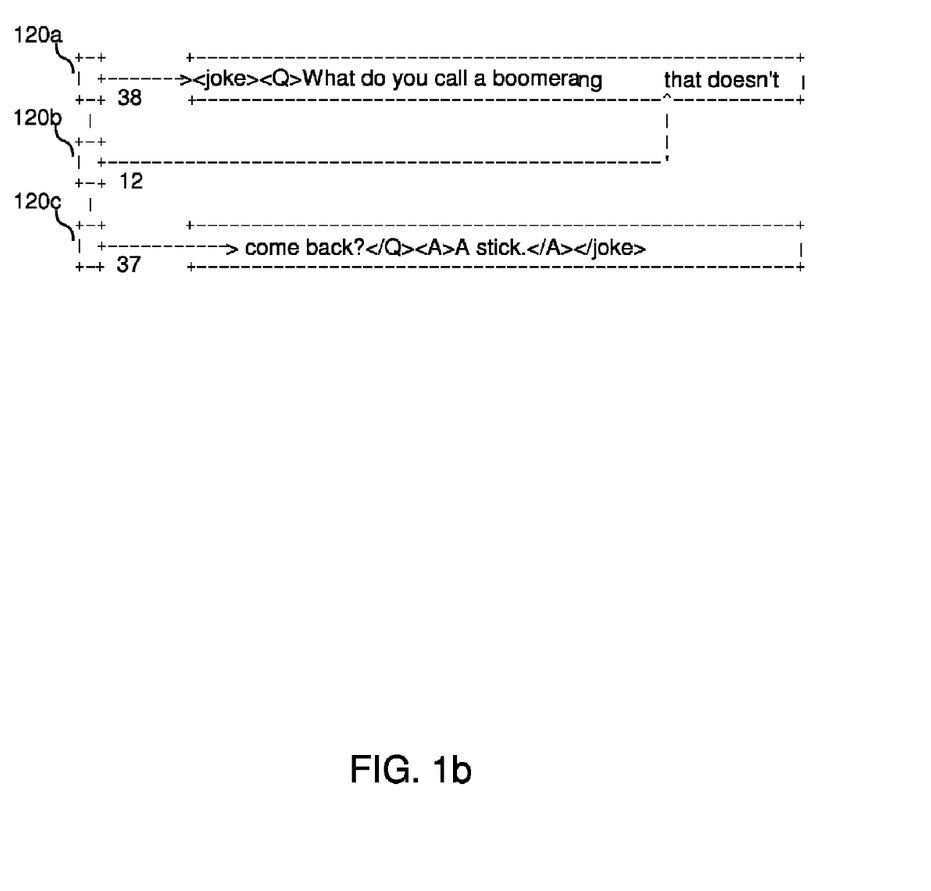
FIG. 1b is an exemplary representation of structured document fragments of a structured document.

FIG. 1b is an exemplary representation of structured document fragments of a structured document.

As shown in FIG. 1b, the structured document is divided into the structured document fragments and an ordered list of descriptors pointing to the structured document fragments is created. A typical implementation of the ordered list can use, for example a doubly linked list. Each descriptor includes a pointer to the respective structured document fragment. As shown in FIG. 1b, 120a, 120b and 120c are descriptors including pointers to the respective structured document fragments, wherein the pointers point to the start location of the respective structured document fragment. Further, the descriptors 120a, 120b and 120c form the ordered list. Each descriptor, for example 120a, 120b or 120c can include information regarding the size of the respective structured document fragment. For example, the structured document fragment pointed by the descriptor 120a can be 38 bytes long. Similarly, the structured document fragments pointed by the descriptors 120b and 120c can be 12 bytes long and 37 bytes long respectively. Further, the whole structured document can be read by following the ordered list of descriptors. For example, 38 bytes corresponding to the descriptor 120a is read and then 12 bytes corresponding to the descriptor 120b is read and finally 37 bytes corresponding to the descriptor 120c is read and thereby the whole structured document is read.

FIGS. 1c, 1d, 1e and 1f are exemplary representations illustrating various manipulation operations performed on the structured document fragments of the structured document.

The various manipulation operations are performed to the exemplary representation of the structured document fragments of the structured document of FIG. 1b.

Figure 1C:
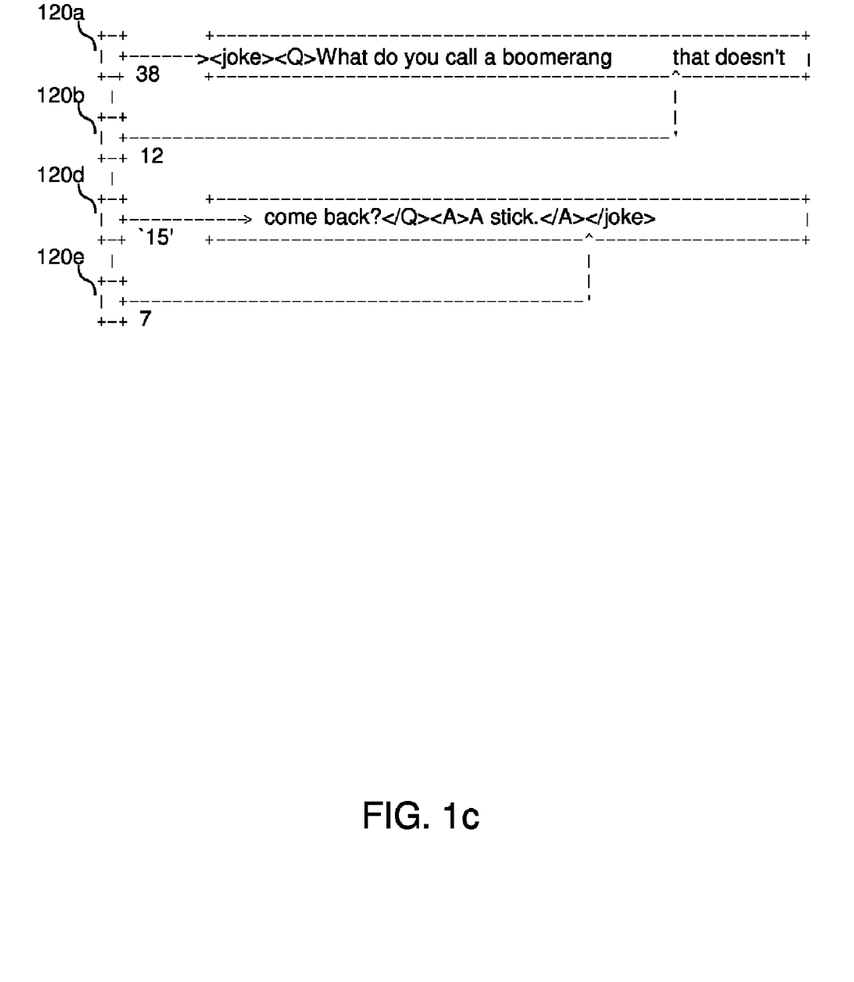
FIGS. 1c, 1d, 1e and 1f are exemplary representations illustrating various manipulation operations performed on the structured document fragments of the structured document.

A first manipulation operation, for example, deleting text of the structured document of FIG. 1b is illustrated in FIG. 1c. To illustrate the "delete" operation, consider text "<A>A stick.</A>" pointed by descriptor 120c to be deleted.

In order to delete text "<A>A stick.</A>", descriptors 120c is modified to 120d and a new descriptor 120e is created. Since there is no descriptor pointing to text "<A>A stick.</A>", text "<A>A stick.</A>" is not read while reading the structured document. Therefore, length of the respective descriptor is adjusted for deleting text of the structured document.

Figure 1D:
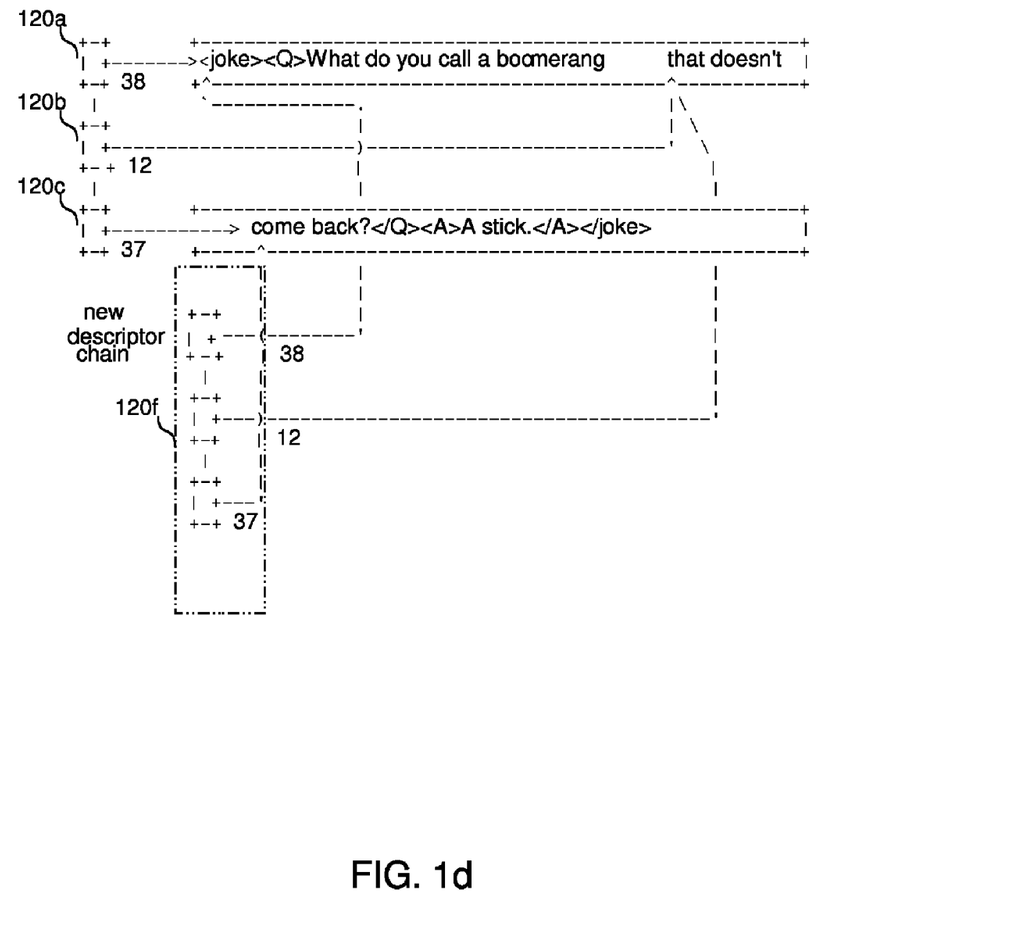

A second manipulation operation, for example, copying the entire stream of the structured document of FIG. 1b is illustrated in FIG. 1d.

As shown in FIG. 1d, to copy the entire stream of the structured document of FIG. 1b, a new ordered list of descriptors 120f is created, wherein the each descriptor of the ordered list of descriptors 120f includes pointers to the respective structured document fragments. In some embodiments, the new ordered list of descriptors 120f is an identical copy of exemplary representation of structured document fragments of a structured document of FIG. 1b.

Figure 1E:
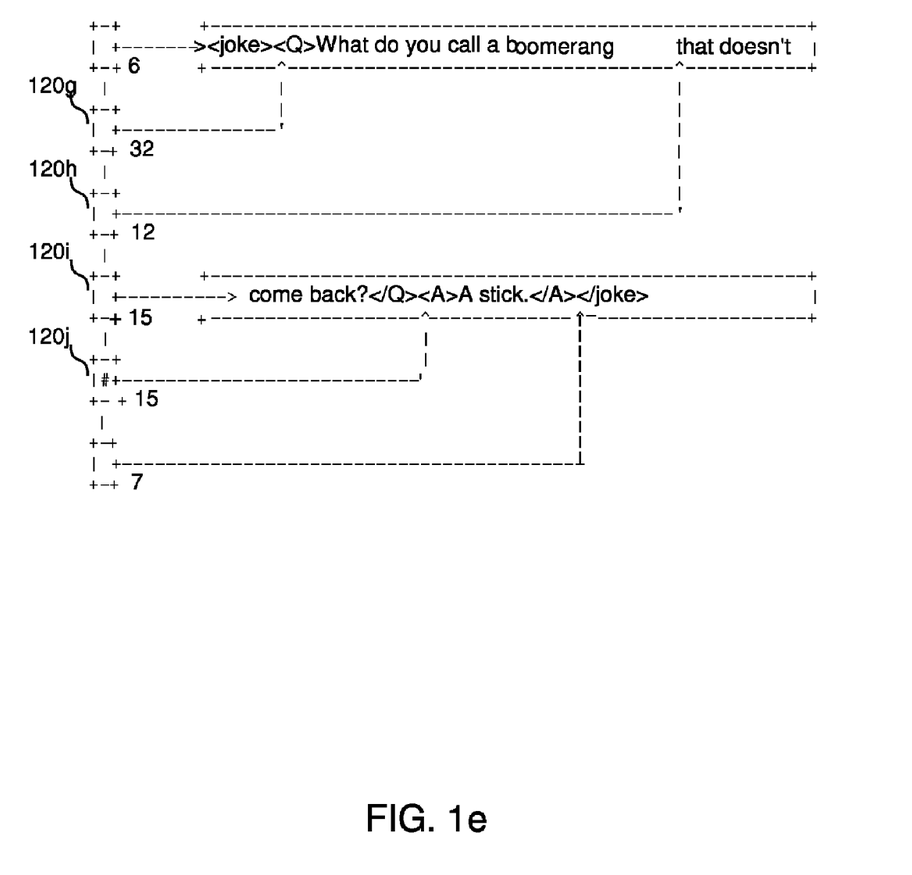
Figure 1F:
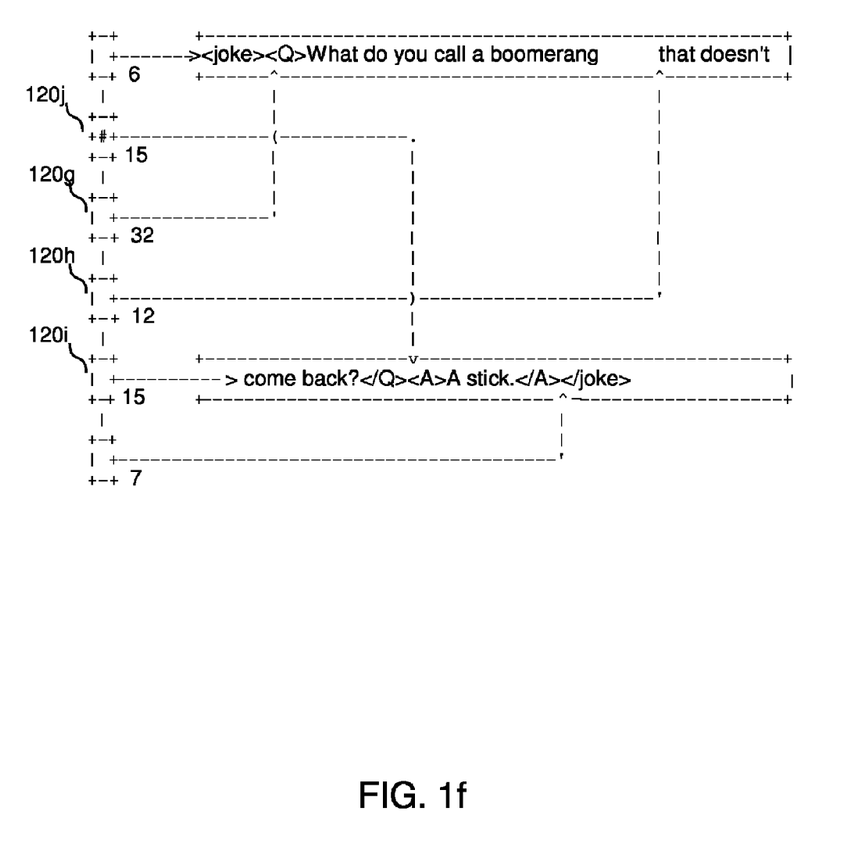

A third manipulation operation, for example, moving a piece of text in the structured document of FIG. 1b is illustrated in FIGS. 1e and 1f. Consider the structured document fragment representation of FIG. 1a. In order to illustrate the method for moving a text, consider, answer "<A>A stick.</A>" has to be moved before the question "<Q>What do you call a boomerang that doesn't come back?</Q>". The descriptors pointing to the respective structured document fragments are split as shown in FIG. 1e.

The descriptor 120a is split into the descriptors, 120g and 120a copy (not shown in FIG. 1e), wherein the descriptor 120a copy is of shorter length as compared to the descriptor 120a. Further, the descriptor 120c is modified to create the descriptor 120i and the descriptor 120j is created as a result of the split. Further, the descriptor 120h is a copy of the descriptor 120b. In some embodiments, the descriptors are split in order to facilitate the operation of movement of text to any arbitrary position.

Further, descriptors 120g, 120h, 120i and 120j are re-arranged in order to move the answer before the question. The exemplary representation of the structured document fragments illustrating the operation of moving the answer before the question is as shown in FIG. 1*f*.

The order of the descriptors pointing to the respective structured document fragments arranged in the ordered list is changed to 120*j*, 120*g*, 120*h* and 120*i* illustrating the movement of the answer "<A>A stick.</A>" before the question "<Q>What do you call a boomerang that doesn't come back?</Q>".

Figure 2:
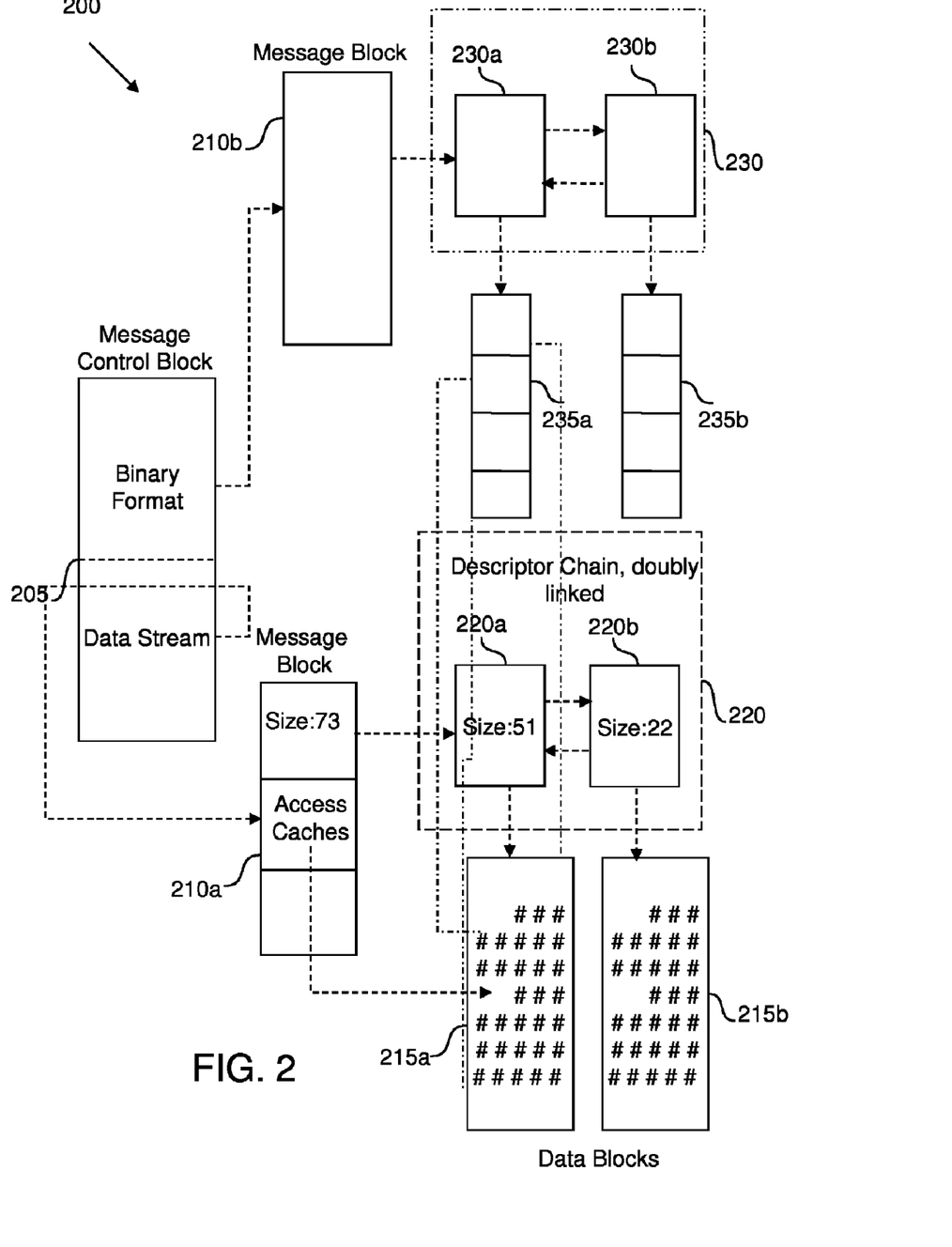
FIG. 2 is a block diagram of a system illustrating a buffer design to facilitate efficient processing of a structured document in accordance with one embodiment.

FIG. 2 is a block diagram of a system 200 illustrating a buffer design to facilitate efficient processing of a structured document in accordance with one embodiment.

The system 200 includes a message control block 205. The message control block 205 can include one or more message block pointers to one or more message blocks, for example message block 210*a* and message block 210*b*. The system 200 also includes one or more binary tokens including 235*a* and 235*b*. The binary tokens, 235*a* and 235*b*, include pointers to one or more data blocks, for example 215*a* and 215*b*. In some embodiments, the binary tokens, 235*a* and 235*b*, can be maintained in separate data blocks and can include respective descriptor chain, for example descriptor chain 230. Each of the message blocks, 210*a* and 210*b*, includes pointers to ordered lists of descriptors 220 and 230 respectively. Each of the ordered lists, 220 and 230, includes one or more descriptors, for example 220*a* and 220*b* corresponding to the ordered lists 220*a*, and 230*a* and 230*b* corresponding to the ordered list 230 respectively.

The message control block 205 in the buffer design can include multiple pointers to the multiple message blocks 210*a* and 210*b*. Contents of the message control block 205 can include but is not limited to, data stream, binary format, information regarding binary tokens and results.

In some embodiments, the binary tokens 235*a* and 235*b* are binary representations of a structured document fragment, for example, an XML document fragment. Each binary token, for example 235*a* and 235*b*, includes information. The information can include but is not limited to, token type, length of the text, a bunch of flags and hash of the text.

The message blocks 210*a* and 210*b*, include pointers to the ordered lists of descriptors, 220 and 230 respectively. The message blocks 210*a* and 210*b* includes access caches. The access caches are direct pointers to the data blocks, for example the data block 215*a*. An access cache facilitates a random seek in the data blocks, for example the data block 215*a*. The message blocks 210*a* and 210*b* can also include "lseek" pointers. The "lseek" pointers are stored in the form of offset values. The access caches can include pointers that point directly to the offset denoted by the "lseek" pointers in order to facilitate maximum speed. However, if the data blocks 215*a* and 215*b* are altered by a manipulation operation, for example, detaching data or inserting data, the access cache pointers are initialized and are updated for a next access.

Further, maintaining the descriptors 220*a*, 220*b*, 230*a*, and 230*b* in the ordered list facilitates easy update and traversal. The descriptors 220*a* and 220*b* include pointers to the actual data on the data blocks 215*a* and 215*b*. In some embodiments, the descriptors 220*a*, 220*b*, 230*a*, and 230*b* include information about a location of the structured document fragments, information about the size of available data of the structured document fragment and information about the preceding and succeeding descriptors. Alternatively, the descriptors 230*a* and 230*b* include pointers to the binary tokens 235*a* and 235*b* as shown in FIG. 2. Further, multiple descriptors can point to a same data block with different offsets. This can enable chunked encoding where some part of data can be skipped as chunk encoding header. Further, if some tokens are deleted another descriptor can be added and the offset or the length can be suitably adjusted.

In some embodiments, the data blocks 215*a* and 215*b* include a header which carries at least one reference count herein referred to as refcount. When the data blocks 215*a* and 215*b* are enqueued by one or more processes, the data blocks 215*a* and 215*b* are enqueued with a refcount of '1'. Further, the refcount is incremented when the preprocessor or subsequent operations change the descriptor list. The refcount can be incremented as the number of the descriptors pointing to the same data block, for example 215*a* or 215*b* increases.

Further, the structure stored in the buffer design of the system 200 is used for manipulating the structured documents. The manipulating of the structured documents can include but is not limited to copying text, moving text, inserting text and replacing text. The manipulating can also include copying parts of the structured document, copying the entire structured document and deleting parts of the structured document. Storing the structured document in the form of fragments and creating ordered list of descriptors for each of the fragments facilitates an efficient method of manipulating the structured document. In some embodiments, manipulating the structured document can include editing or amending the structured document. The structured document can be manipulated using the ordered list of descriptors.

Therefore, some embodiments facilitate memory efficient storage of the structured documents in the memory of the information processing system. Further, the structured documents are not required to be stored in contiguous memory, therefore large structured documents can be stored in the memory even if the total available memory is fragmented. Further, some embodiments provide an efficient mechanism for modifying structured documents. Also, a large number of modifications can be performed in specified time since the modifying mechanism is power efficient and memory efficient.

One or more steps of the method described in FIG. 1 can be implemented using a computer system. An exemplary computer system is explained in conjunction with FIG. 3.

Figure 3:
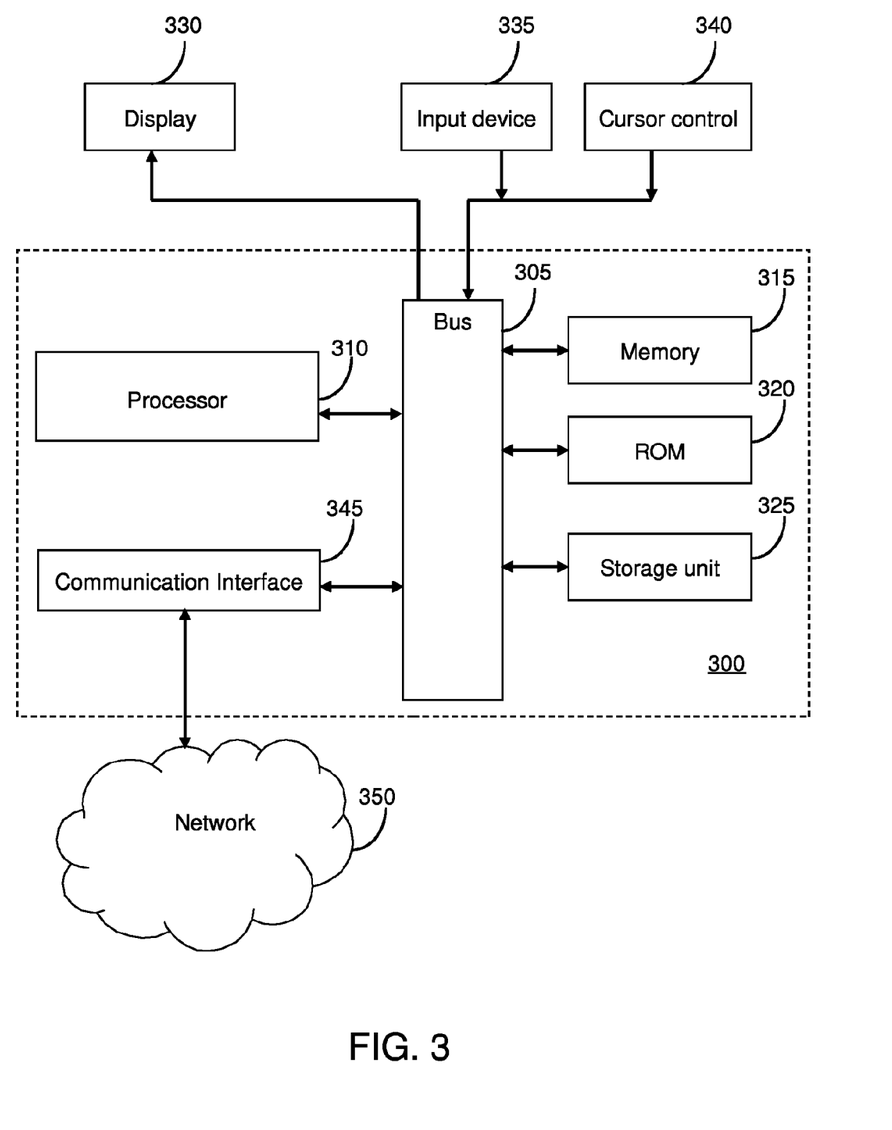
FIG. 3 is a block diagram of an exemplary computer system in accordance with which various embodiments can be implemented.

FIG. 3 is a block diagram of an exemplary computer system 300 in accordance with which various embodiments can be implemented.

The computer system 300 includes a bus 305 or other communication mechanism for communicating information. The computer system 300 includes a processor 310 coupled with the bus 305. The computer system 300 also includes a memory 315, such as a random access memory (RAM) or other dynamic storage device, coupled to the bus 305 for storing information which can be used by the processor 310. The memory 315 can be used for storing any temporary information required. The computer system 300 further includes a read only memory (ROM) 320 or other static storage device coupled to the bus 305 for storing static information for the processor 310. A storage unit 325, for example a magnetic disk or optical disk, is provided and coupled to the bus 305 for storing information and instructions.

The computer system 300 can be coupled via the bus 305 to a display 330, such as a liquid crystal display (LCD), for displaying information to a user. An input device 335, including alphanumeric and other keys, is coupled to the bus 305 for communicating an input to the processor 310. Another type of user input device is a cursor control 340, such as a joystick, a stylus, or cursor direction keys for communicating the input to the processor 310 and for controlling cursor movement on the display 330. The input device 335 can be included in the display 330, for example a touch screen.

Various embodiments are related to the use of the computer system 300 for implementing the techniques described herein. In one embodiment, the techniques are performed by the processor 310 using information included in the memory 315. The information can be read into the memory 315 from another machine-readable medium, such as the storage unit 325.

The term "machine-readable medium" as used herein refers to any medium that participates in providing data that causes a machine to operate in a specific fashion. In an embodiment implemented using the computer system 300, various machine-readable medium are involved, for example, in providing information to the processor 310. The machine-readable medium can be a storage media. Storage media includes both non-volatile media and volatile media. Non-volatile media includes, for example, optical or magnetic disks, such as the storage unit 325. Volatile media includes dynamic memory, such as the memory 315. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

The computer system 300 also includes a communication interface 345 coupled to the bus 305. The communication interface 345 provides a two-way data communication coupling to a network 350. The network 350 can transmit a requested code for an application program through the communication interface 340.

Those skilled in the art will recognize that a wide variety of modifications, alterations, and combinations can be made with respect to the above described embodiments without departing from the scope of the present disclosure, and that such modifications, alterations, and combinations are to be viewed as being within the ambit of the inventive concept.

The foregoing description sets forth numerous specific details to convey a thorough understanding of embodiments of the present disclosure. However, it will be apparent to one skilled in the art that embodiments of the present disclosure may be practiced without these specific details. Some well-known features are not described in detail in order to avoid obscuring the present disclosure. Other variations and embodiments are possible in light of above teachings, and it is thus intended that the scope of the present disclosure not be limited by this Detailed Description, but only by the Claims.

What is claimed is:

1. A computer-implemented method of manipulating a structured document, the method comprising:
   creating, by a computer, fragments of the structured document, comprising one or more message blocks having access caches and lseek pointers that point to a descriptor in an ordered list along with an offset of a data referred;
   creating the ordered list including a plurality of descriptors pointing to the structured document fragments; and
   modifying the ordered list for the manipulating of the structured document.

2. The method of claim 1, wherein each of the plurality of descriptors point to a start location of data in a structured document fragment and comprises length of the data.

3. The method of claim 1 further comprising:
   storing the plurality of descriptors last accessed in an access cache.

4. The method of claim 1 further comprising:
   the plurality of descriptors pointing to a same data block with different offsets.

5. The method of claim 1, wherein the manipulating comprises one or more of adding, removing, moving, and copying parts of the structured document.

6. A system comprising:
   a memory, implemented in hardware, to store one or more message blocks comprising the one or more message blocks having access caches and lseek pointers that point to a descriptor in an ordered list along with an offset of a data referred;
   a message control block for pointing to the one or more message blocks;
   one or more data blocks;
   a plurality of binary tokens for pointing to the one or more data blocks; and
   a plurality of ordered lists of descriptors, wherein a structured document is manipulated.

7. The system of claim 6, wherein the message control block comprises one or more of a data stream and a binary format.

8. The system of claim 6, wherein each of the one or more message blocks comprises:
   a plurality of access caches and a plurality of lseek pointers for pointing to the one or more data blocks.

9. The system of claim 6, wherein the descriptors point to a same data block with different offsets.

10. A non-transitory computer-readable storage medium with computer code stored therein configured to manipulate a structured document, the computer program product comprising a computer readable program code to cause a processor to perform a method, the method comprising:
    creating, by a computer, fragments of the structured document comprising one or more message blocks having access caches and lseek pointers that point to a descriptor in an ordered list along with an offset of a data referred;
    creating the ordered list including a plurality of descriptors pointing to the structured document fragments; and
    modifying the ordered list for the manipulating of the structured document.

* * * * *